US008998267B2

United States Patent
Prescott et al.

(10) Patent No.: US 8,998,267 B2
(45) Date of Patent: Apr. 7, 2015

(54) CRYOGENIC PIPELINE CONFIGURATIONS AND METHODS

(75) Inventors: Clifford Neal Prescott, Houston, TX (US); Jianfeng Zhang, Sugarland, TX (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 2080 days.

(21) Appl. No.: 10/593,740

(22) PCT Filed: Mar. 23, 2005

(86) PCT No.: PCT/US2005/009808
§ 371 (c)(1),
(2), (4) Date: Aug. 18, 2008

(87) PCT Pub. No.: WO2005/119150
PCT Pub. Date: Dec. 15, 2005

(65) Prior Publication Data
US 2008/0296890 A1    Dec. 4, 2008

Related U.S. Application Data

(60) Provisional application No. 60/556,535, filed on Mar. 26, 2004.

(51) Int. Cl.
*F16L 17/00* (2006.01)
*F16L 59/14* (2006.01)
*F16L 7/02* (2006.01)

(52) U.S. Cl.
CPC .............. *F16L 59/141* (2013.01); *F16L 7/02* (2013.01); *F16L 59/143* (2013.01)

(58) Field of Classification Search
USPC ................ 285/47, 120.1, 123.5, 124.2, 285/123.15–123.17, 288.1, 288.2, 288.9, 285/288.11; 138/108, 112, 148–149
See application file for complete search history.

(56) References Cited

U.S. PATENT DOCUMENTS

| | | | | |
|---|---|---|---|---|
| 1,140,633 A | * | 5/1915 | Trucano | 285/47 |
| 2,964,064 A | * | 12/1960 | Jones | 285/47 |
| 3,275,345 A | * | 9/1966 | Waldron et al. | 285/47 |
| 3,369,826 A | * | 2/1968 | Boosey et al. | 285/47 |
| 3,371,946 A | * | 3/1968 | Bleyle, Jr. et al. | 285/47 |
| 3,453,716 A | * | 7/1969 | Cook | 29/421.1 |
| 3,693,665 A | | 9/1972 | Veerling et al. | |
| 3,865,145 A | | 2/1975 | McKay et al. | |
| 4,219,224 A | | 8/1980 | Hanley | |
| 4,340,245 A | * | 7/1982 | Stalder | 285/53 |
| 4,415,184 A | * | 11/1983 | Stephenson et al. | 285/47 |
| 4,417,603 A | * | 11/1983 | Argy | 138/149 |
| 4,635,967 A | * | 1/1987 | Stephenson | 285/45 |
| H594 H | | 3/1989 | Adorjan | |
| 5,400,828 A | | 3/1995 | Ziu | |
| 6,000,438 A | | 12/1999 | Ohrn | |

(Continued)

FOREIGN PATENT DOCUMENTS

| | | |
|---|---|---|
| EP | 0412715 B1 | 2/1993 |
| GB | 1422156 | 1/1973 |
| GB | 1348318 | 3/1974 |
| GB | 2161565 | 1/1986 |

(Continued)

*Primary Examiner* — Aaron Dunwoody
(74) *Attorney, Agent, or Firm* — Fish & Tsang, LLP

(57) ABSTRACT

A pipe-in-pipe pipeline has a bulkhead that transfers thermal stress from an inner pipe to an outer pipe, wherein at least part of the bulkhead forms a conduit for a product traveling through the inner pipe.

7 Claims, 3 Drawing Sheets

(56) References Cited

U.S. PATENT DOCUMENTS 6,145,547 A 11/2000 Villatte
7,207,603 B2 * 4/2007 Segreto ............................ 285/47
7,494,155 B2 * 2/2009 Offredi ............................ 285/47

FOREIGN PATENT DOCUMENTS

| GB | 2168450 | 6/1986 |
| GB | 2186657 A | 8/1987 |
| WO | 2004/099554 | 11/2004 |

* cited by examiner

CRYOGENIC PIPELINE CONFIGURATIONS AND METHODS

This application claims the benefit of our U.S. provisional patent application with the Ser. No. 60/556,535, which was filed Mar. 26, 2004, and which is incorporated by reference herein.

FIELD OF THE INVENTION

Configurations and methods for pipelines in which cryogenic materials (typically at least below −200° F.) are transported.

BACKGROUND OF THE INVENTION

Cryogenic transport of fluids and/or gases in pipelines is often problematic as the low temperature of fluids or gases entering the pipeline leads to substantial shrinkage of most pipe materials, thereby generating significant thermal stress. While numerous attempts have been made to accommodate for thermal stress, new difficulties arose with such solutions.

In most known configurations, cryogenic pipelines have a pipe-in-pipe configuration in which an outer protective pipe circumferentially encloses an inner pipeline in which the cryogenic material is transported. Thus, such systems typically include an annular space that is filled with an insulating material or that is evacuated to a low pressure. Examples for such insulations include foam insulators as taught in EP 0412715, cylindrically wound aerogels as disclosed in W2004/099554, and use of a vacuum as described in GB 1422156. However, all or almost all of the known insulating materials fail to alleviate thermal stress that develops as the cryogenic material enters the pipeline. Therefore, even though insulating reduce cold loss to at least some degree, insulating materials fail to provide any structural support to the pipe-in-pipe configuration.

To reduce thermal stress and to improve structural stability of the pipeline, corrugated insulation material may be employed as described in GB 2168450. Alternatively, the annular space may be pressurized as reported in statutory invention registration H594. However, such stabilization is typically still insufficient, especially for relatively long pipelines. Thermal stress may also be reduced by providing expansion joints and/or bellows that allow movement of one pipeline segment relative to another pipeline segment as described in GB 2186657. Unfortunately, while such configurations significantly (if not even entirely) reduce thermal stress on the cryogenic pipeline, new disadvantages arise. Among other things, expansion joints and/or bellows are prone to leakage, relatively difficult to install, and once defect, cumbersome to replace.

Alternatively, thermal stress may also be reduced in a pipe-in-pipe configuration by coupling the cryogenic pipe with the outer pipe using a stress cone that translates axial stress of the outer pipe into compression stress on the cryogenic pipe as described in U.S. Pat. Nos. 3,865,145 and 4,219,224. In such configurations, the outer pipe is pre-stressed on the end portions when the pipeline is assembled, which results in a compression load on the cryogenic pipe. Once the cryogenic material is in the cryogenic pipe, the thermal contraction balances the compression. Similarly, as described in GB 1,348,318, thermal shrinkage forces of the cryogenic pipe are transferred to an outer jacket, which may optionally be pre-stressed. Such configurations are conceptually attractive as they are relatively simple to install, and allow control over the degree of force transfer. However, in such configurations, installation is relatively complex as numerous welds need to be placed in sequence. Moreover, due to the particular attachment of the outer pipe to the inner pipe, and placement and configuration of the stress cones, the stress forces are focused on the welds that connect one cryogenic pipe segment to the next segment.

In yet further known approaches, the cryogenic product pipeline is manufactured from INVAR™ (36% Nickel steel), which has very low expansion and contraction properties as taught in U.S. Pat. No. 6,145,547. Consequently, thermal stress in such pipelines is almost completely avoided and construction is substantially simplified. However, INVAR™ steel is relatively expensive, and therefore often cost-prohibitive.

Therefore, while various configurations for cryogenic pipelines are known in the art to reduce thermal loss and stress, all or almost all of them suffer from several disadvantages. Therefore, there is still a need for improved configurations and methods for cryogenic pipelines.

SUMMARY OF THE INVENTION

The present invention is directed to methods and configurations for pipelines, and especially cryogenic pipelines comprising a bulkhead that transfers thermal stress from an inner pipe to an outer pipe using a bulkhead, wherein part of the bulkhead forms a conduit that fluidly couples two inner pipes of the pipeline and that transfers a product from one of the two inner pipes to the other pipe. Most preferably, the pipeline is a cryogenic pipeline for transport of liquefied natural gas (LNG), and the bulkhead is a metallic bulkhead. However, in alternative aspects, non-metallic bulkheads are also deemed suitable for use herein. Such non-metallic bulkheads will typically transfer thermal stress via friction coupling between the inner and outer pipes and will only in some cases form a conduit for the product conveyed in the inner pipe.

In one aspect of the inventive subject matter, a cryogenic pipeline has a bulkhead with an inner transition element, and a first and second outer transition element coupled to and at least partially surrounding the inner transition element. In such embodiments, it is preferred that the inner transition element forms a conduit that transfers cryogenic product from a first cryogenic pipeline to a second cryogenic pipeline. The first and second outer transition elements preferably couple a first and second jacket pipeline to the first and second cryogenic pipelines, respectively, such that thermal stress load in the first and second cryogenic pipelines is transferred to the first and second jacket pipelines, respectively.

Most preferably, the inner transition element has a pipe configuration with an inner diameter that is substantially identical to an inner diameter of the first and second cryogenic pipelines, and/or at least one of the outer transition elements has an outer diameter that is substantially identical to an outer diameter of the first and second jacket pipelines. A sleeve may further be disposed in a space between the first and second outer transition elements, and at least one of the inner transition element and the first and second cryogenic pipelines are at least partially enclosed by an insulating material. Additionally, an external insulation may be provided that covers the first and second outer transition elements. Typically, but not necessarily, the inner transition elements and the outer transition elements are contiguous. Where desirable, a weight (e.g., a coating) can be coupled to at least one of the first and second jacket pipelines.

Therefore, in yet another aspect of the inventive subject matter, a field joint for a cryogenic pipe-in-pipe pipeline is contemplated, in which an inner portion of the field joint fluidly couples a first and a second section of a product conduit of the pipeline, in which an outer portion couples a first and a second section of a jacket of the pipeline, and in which inner and outer portions are coupled together such that thermal stress load from first and second sections of the product conduit is transferred to the first and second sections of the jacket in the pipeline, respectively.

Most typically, the outer portion of contemplated field joints is separated into two ring-shaped elements that are coupled to the inner portion via an angled connector, and/or a sleeve is disposed in a space between the two ring-shaped elements. In further preferred aspects, insulating material may be coupled to at least one of the product conduit and the inner portion, and insulating material may cover the outer portion to form an external insulation.

In a still further aspect of the inventive subject matter, a method of coupling first and second pipe-in-pipe pipelines may therefore include a step in which a field joint is provided that has an inner portion and an outer portion. In another step, the inner portion is coupled to a first and a second section of a product conduit in a pipe-in-pipe pipeline, and in yet another step, the outer portion is coupled to a first and a second section of a jacket in the pipe-in-pipe pipeline, wherein the step of fluidly coupling and coupling is performed such that the inner and outer portions cooperate to transfer thermal stress loads from the first and second sections of the product conduit to the first and second sections of the jacket in the pipe-in-pipe pipeline, respectively.

Various objects, features, aspects and advantages of the present invention will become more apparent from the accompanying drawing and the following detailed description of preferred embodiments of the invention.

DETAILED DESCRIPTION

The inventors discovered that pipelines, and especially those transporting material at sub-ambient temperature (e.g., cryogenic material) can be constructed in a manner such that the pipeline has both increased mechanical stability and desirable thermal insulation while maintaining a mechanically simple structure, which is relatively inexpensive to manufacture and install.

In particularly preferred aspects of the inventive subject matter, a cryogenic pipeline is manufactured from conventional materials. For example, the product pipe in a pipe-in-pipe pipeline can be manufactured from steel rated for cryogenic service (e.g., 9% Nickel steel), while the jacket pipe can be manufactured from carbon steel. Thermal insulation in such configurations is preferably a high performance nanoporous aerogel product, typically about 2 inches thick, in blanket form installed within the annular space at ambient pressure.

In one exemplary aspect of the inventive subject matter, a plurality of bulkheads (non-metallic, hybrid, or metallic) and spacers are employed to create an annular space between a product pipeline and a outer pipeline, wherein the annular space is at least partially filled with a microporous or nanoporous insulating material. The bulkheads are preferably configured (and coupled to the inner and outer pipeline) such that the bulkheads transfer the contraction induced axial compression load on the inner cryogenic product pipeline(s) to the outer jacket pipeline. In most embodiments of such pipelines, the pressure in the annular space will be ambient pressure. Consequently, it should be appreciated that the so configured pipe(s)-in-pipe system functions as a structural column, with thermal insulation maintained in the annular space in an ambient pressure environment, thereby eliminating the need for expensive alloys, vacuum generation/maintenance, or use of expansion bellows.

More particularly, in further preferred aspects of the inventive subject matter, the bulkheads that connect the inner and outer pipelines at the ends of the pipeline balance compression forces with rigidity of the outer pipeline. In such configurations, contraction forces transferred to the external pipeline, which is thereby compressed. To prevent buckling, spacers (e.g., thermally isolating) are placed around the inner product pipeline that maintain a predetermined distance between the pipes, while further cryogenic foam (e.g., nanoporous or microporous foam) is placed around the remaining surface of the product pipeline. It should be especially appreciated that such pipeline configurations advantageously allow use of 9% nickel steel for the product pipeline to reduce cost of manufacture.

Figure 1A:
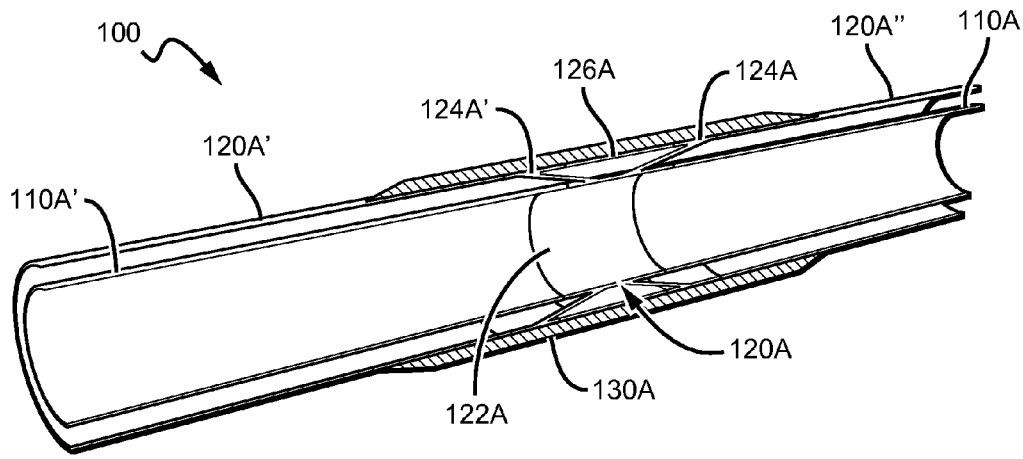
FIG. 1A is a schematic of a section of one pipeline with a bulkhead according to the inventive subject matter.

For example, one preferred pipeline is depicted in FIG. 1A. Here, the pipeline 100 is configured as a pipe-in-pipe pipeline having an inner product pipe that is formed by first and second inner pipe sections 110A and 110A', respectively. The outer pipe sections 120A and 120A' circumferentially enclose the inner sections. Field joint 120A comprises an inner portion 122A that forms part of the product conduit via fluid coupling to the inner pipes, and an outer portion 124A and 124A' that are coupled to the outer pipe sections 120A and 120A'. An additional outer intermediate section 126A couples the outer portions 124A and 124A', and an insulating layer 130A may be provided to reduce potential cold loss.

Figure 1B:
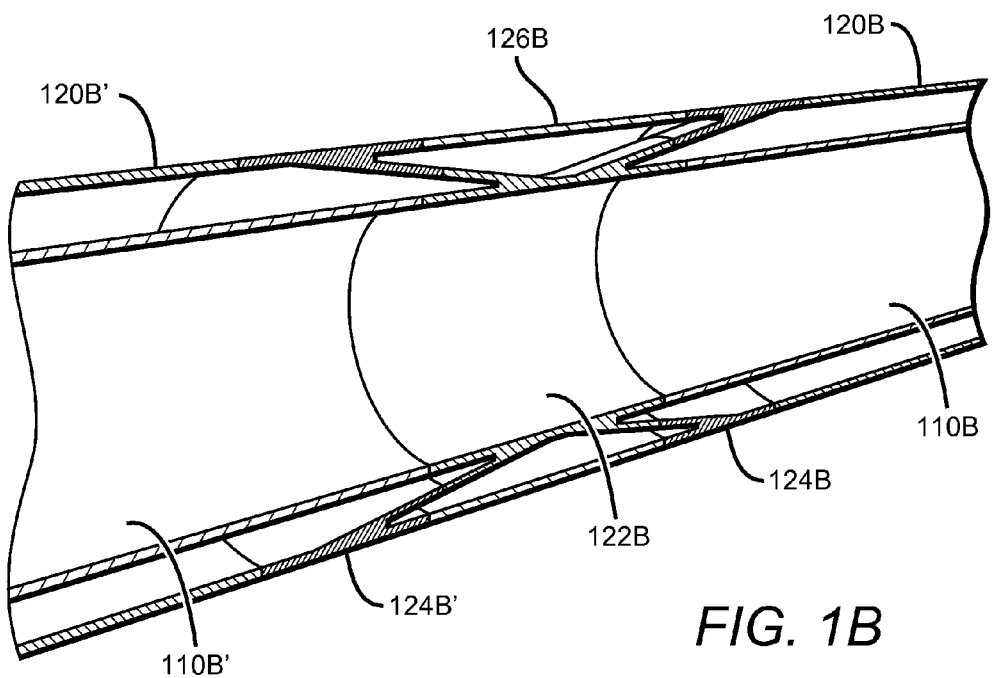
FIG. 1B is a detail view of the bulkhead of FIG. 1A.

FIG. 1B depicts a detail view of the field joint 120A of FIG. 1A. Here, the inner portion 122B is welded to the inner pipe sections 110B and 110B', respectively, and further welded to the outer portions 124B and 124B' that are in turn welded to the outer pipe sections 120B and 120B'. As above, intermediate section 126B is welded to the outer portions 124B and 124B'. Of course, it should be recognized that while it is generally preferred that the field joint is constructed in situ by welding, unitary field joints may also be employed (which then have to be only welded (or otherwise coupled, including screwing, flanging, and gluing) to the inner and outer sections. Several grades of stainless steel have been evaluated for the configuration, and depending upon the service requirements and pipeline configuration, it has been determined that the following materials are particularly preferred for use in the contemplated configurations (Type 316 stainless steel (ASTM A312), and/or 9Ni Steel (ASTM 333 Grade 8 pipe)). It should further be recognized that the inner and/or outer pipe may be installed with pretension to relax/contract upon cooling when the cryogenic material is conveyed. However, non-pretensioned configurations are generally preferred.

Figure 1C:
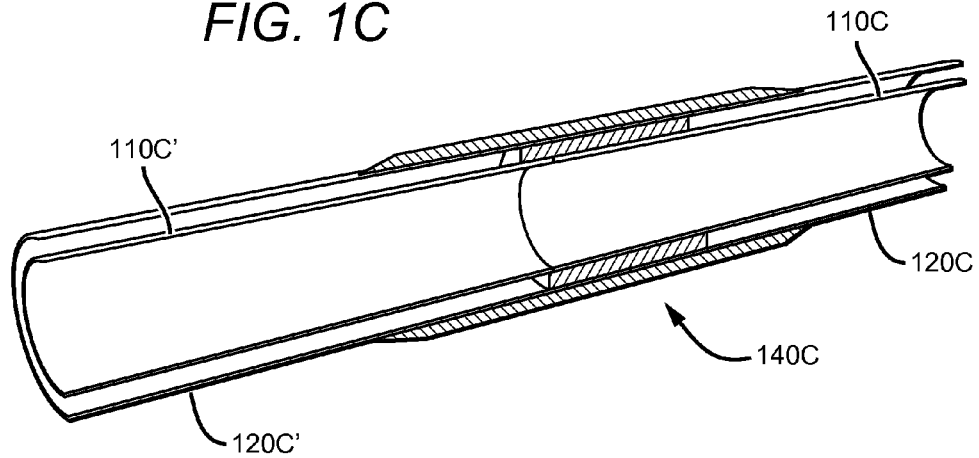
FIG. 1C is a schematic of a section of another pipeline with a bulkhead according to the inventive subject matter.

Alternatively, as depicted in FIG. 1C, the thermal stress may also be transferred from the inner pipe sections to the outer pipe using a non-metallic bulkhead in which thermal stress is transferred from the inner pipe sections 110C and 110C' to the outer pipe sections 120C and 120C' via friction and shear connectors using inner and outer surfaces of the non-metallic bulkhead 140C. A more detailed exemplary view of the non-metallic bulkhead of FIG. 1C is given in FIG. 1D in which the inner and outer insulation are not shown.

Figure 1D:
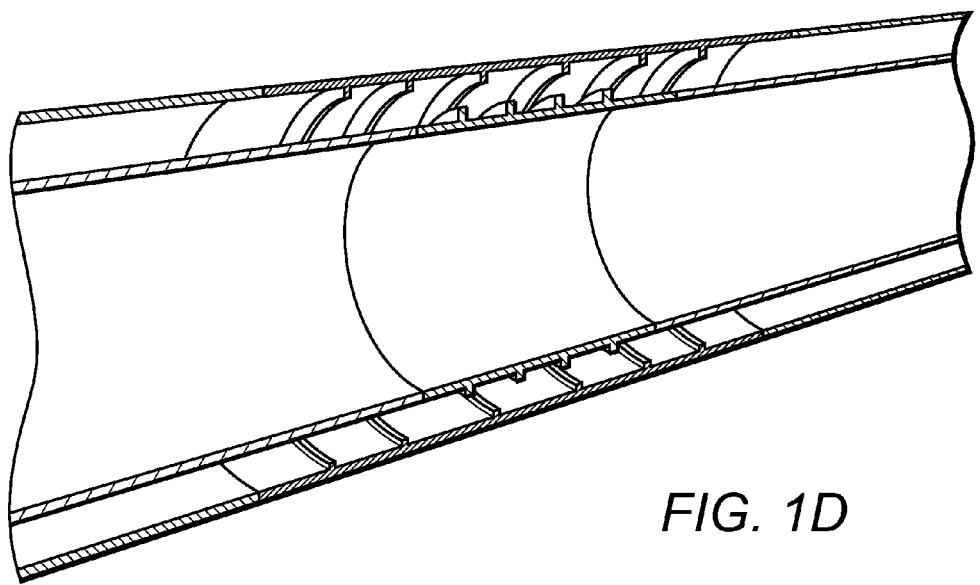
FIG. 1D is a detail view of the bulkhead of FIG. 1C.

The non-metallic bulkheads contemplated herein are typically used as intermediate bulkheads, which provide some thermal stress load transfer sharing with the primary end bulkheads, which are preferably metallic. The non-metallic bulkheads preferably include a hardened syntactic foam, which not only acts as an insulator, but also as a medium upon which to transfer the thermal stresses, which are transferred through friction between the inner conduit and the outer casing pipe. It may be necessary, depending upon the final thermal stress loads for the application to add shear connectors, which may be welded as bands to the field joint or formed in a pre-fabricated or forged shape. These field joint pieces can be installed between two regular sections of pipe and most preferably also form a product conduit. The inner conduit would be a short section of pipe with the shear connectors attached to the external surface, while the outer pipe would include a split sleeve to facilitate assembly and welding (the shear connectors would be applied to the inner surface, as shown in FIG. 1D).

It should be appreciated that the shear connectors may have various shapes, and the particular shape and configuration will at least in part depend upon the final design of the non-metallic bulkhead, the material properties of the inner non-metallic insulation, and/or the connector shape. It is further contemplated that the non-metallic bulkhead could be secured to the inner conduit and outer casing pipe with epoxy glue beads or binders to facilitate the transfer by friction and wall surface shear.

In general, it is preferred that metallic bulkheads would be used at the ends of a pipe-in-pipe configuration or at transitional changes in direction, such as at a bend of the pipeline. Non-metallic bulkheads would primarily be used, if used at all, as intermediate bulkheads to transfer thermal stresses in areas where the loads are smaller than at the ends. In a buried or restrained pipeline, the ends would attempt to move more than the inner portion of the pipeline as the loads along the external casing pipe are transferred to the soil in a buried pipeline (or in the case of an above ground pipeline, through restraints on sleepers along its length).

Therefore, it is generally preferred that two bulkheads cooperate to seal the annular space between the bulkheads. In this configuration, it is typically preferred that the annular space is kept at ambient pressure. However, there may be an advantage to keep the annular space at a slightly higher pressure than ambient when incorporating a leak detection system into the overall design. In this case, any change in annular pressure results in a detection of a leak, either external or internal.

Figure 3:
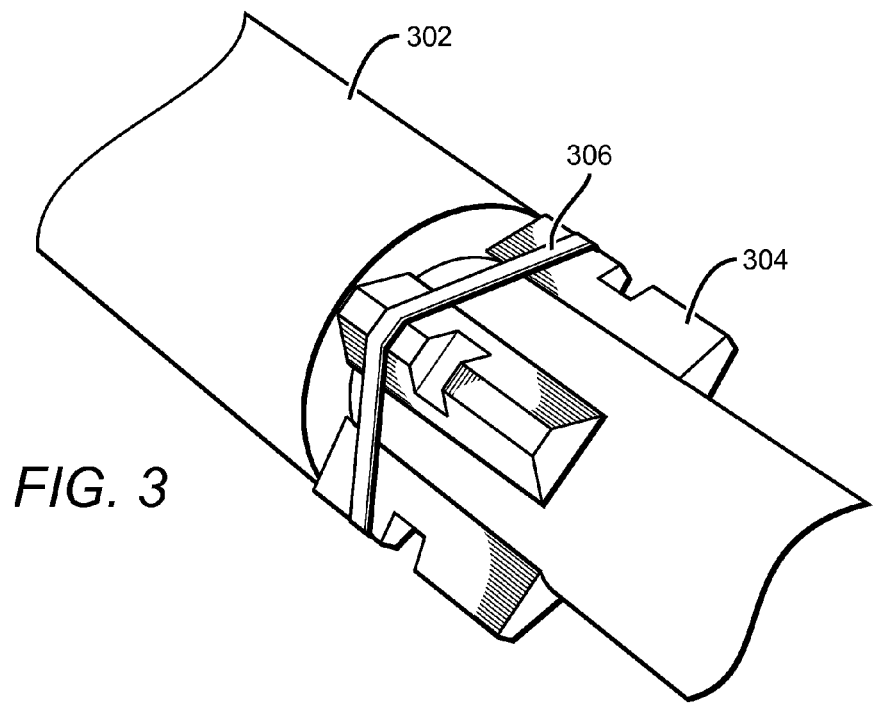
FIG. 3 is a perspective view of an exemplary inner product pipe that is surrounded by insulation and to which spacers are coupled to support an outer pipe.

Metallic bulkheads are used at the ends to effect sealing of the annular space and to allow transfer of the contraction inducted axial compression load. Additionally, non-metallic bulkheads are used throughout the pipeline configuration to provide additional sealing or water stops and to provide additional load transfer. Between these bulkheads, and to facilitate fabrication, non-metallic spacers or centralizers are used to provide additional support and structural rigidity. Exemplary non-metallic spacers are depicted in FIG. 3 (outer pipe not shown) in which the inner pipe is enclosed by a nanofoamed insulator 302 (e.g., various commercially aerogel or other flexible insulation blankets). Spacers 304 are preferably made from an insulating material and rest in the inner pipe, and a restraining band 306 maintains the spacers in a predetermined position.

Insulation and spacer material is preferably kept in an ambient pressure environment, which may be produced through sealing by metal or non-metal bulkheads. The bulkheads transfer the contraction induced axial compression load on the inner cryogenic carrier pipe(s) to the external jacket pipe. The resulting pipeline bundle is a structural element, which addresses the thermal contraction & expansion loads without resorting to expansion bellows or ultra-low thermal contraction alloys.

Further mechanical stability may be imparted by placing the pipe-in-pipe assembly in a restraining environment. For example, contemplated pipelines may be placed in a trench with select back-fill material installed over the pipeline. Therefore, in such configurations, the load on the bulkheads and outer pipeline is transferred into the surrounding soil. Similarly, the pipelines can also be constrained above ground. For example, the pipeline may be placed on a foundation of sleepers that contain sliding or gimbaled supports.

It is generally contemplated that installation of the (pre-fabricated and/or assembled) pipeline can be done by numerous methods well known in the art, and it should be recognized that the particular method of installation will at least in part depend on the configuration and weight of the pipeline. However, particularly preferred methods of installation include the towed method of installation or installation by a surface barge.

With respect to a particular pipeline configuration, it is contemplated that the specific needs will generally dictate the configuration. For example, the internal diameter of a pipeline is typically sized to handle flow requirements for discharging LNG tankers within a specific time frame. Therefore, in such methods of use, pipeline wall thickness will normally be such that the diameter to wall thickness ratio is below 50, which will allow the pipeline to be operated at the low pressures expected. Similar pipeline bundle configurations have been built for bottom tow and controlled depth towed methods of installation in maximum lengths between 7 and 10 miles and towed to an installation site over a distance of between 400 and 500 nautical miles. On the other hand, and especially where a longer tie-back to an onshore site is required, it is contemplated to extend the maximum length beyond 10 miles by changing the LNG product from a low pressure flow to a higher dense phase pressure flow that keeps the LNG within a range to minimize vapor boil off. This configuration, however, requires an increase in the product transfer pipeline wall thickness and a subsequent change in the overall design, with a corresponding reduction in insulation requirements.

Figure 2:
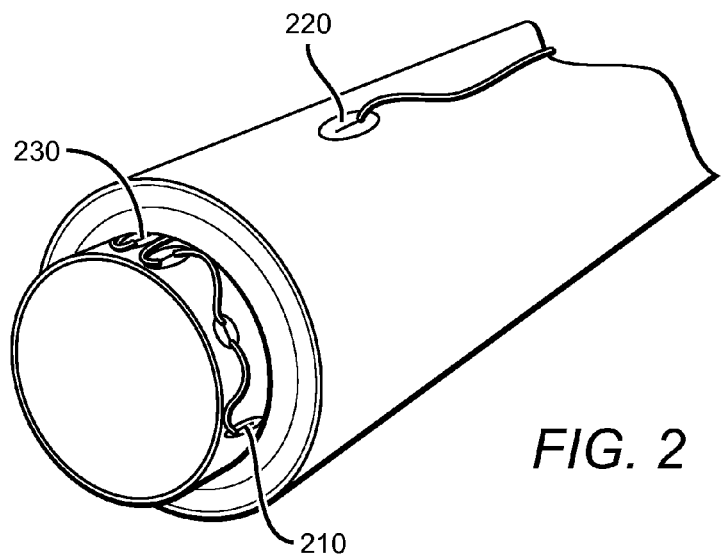
FIG. 2 is schematic of another section of the pipeline of FIG. 1A without the bulkhead.

In still further contemplated aspects, it is preferred that the pipeline will comprise a monitoring system to address the issues of safety and security in the transport of cryogenic materials in a sub-sea environment. For example, in especially preferred aspects, one or more fiber-optic sensors may be provided to measure real-time strain, temperature, vibration, and flow for pipelines in deepwater as schematically depicted in FIG. 2, in which sensors 210, 220, and 230 may be coupled to the inner pipe, outer pipe, and/or be disposed in the insulation space between inner and outer pipes, respectively. Among other advantages, fiber-optic sensors are attractive in deepwater applications because of their multiplexing capability, immunity to electromagnetic interference, ruggedness, and long distance signal transmission ability. Further benefits of fiber-optic sensors include their lightweight construction and relatively small size, and their long life. Still further, fiber-optic sensors are often inert/corrosion resistant, have little or no impact on the physical structure that is to be surveyed, and can be safely operated in an environment with explosive or flammable materials. Recent monitoring experiments by the inventors successfully used fiber-optic sensors (data not shown), and included cryogenic temperature monitoring, strain, and heat flux of contemplated LNG pipeline test sections.

While contemplated pipeline configuration and methods are preferably employed for cryogenic gases and liquids, and especially for LNG offloading and offshore LNG terminals, numerous alternative uses are also considered suitable herein. For example, contemplated alternative uses include transfer lines for floating LNG production, storage, and offloading vessels, liquid hydrogen and oxygen fueling lines for aerospace or other applications, and other applications that need to transport cryogenic products through pipelines. Additionally contemplated uses include LPG transport, transport of gases and liquids having a temperature below ambient temperature (e.g., liquefied carbon dioxide, LPG, liquid nitrogen, etc.).

Thus, specific embodiments and applications of pipeline configurations and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use, of a term in a reference, which is incorporated by reference herein is inconsistent or contrary to the definition of that term provided herein, the definition of that term provided herein applies and the definition of that term in the reference does not apply.

What is claimed is:

1. A cryogenic pipeline comprising:
   a bulkhead having an inner transition element, and distinct first and second outer transition elements coupled to and at least partially surrounding the inner transition element;
   wherein the inner transition element is coupled to and between a first cryogenic pipeline and a second cryogenic pipeline to thereby form a continuous conduit that allows transfer of a cryogenic product from the first cryogenic pipeline through the inner transition element to the second cryogenic pipeline;
   wherein the distinct first and second outer transition elements are coupled to a first and a second jacket pipeline respectively, and wherein the distinct first and second outer transition elements are coupled to the first and second cryogenic pipelines via the inner transition element, respectively, to thereby allow transfer of contractive thermal stress load in the first and second cryogenic pipelines into compressive stress load in the first and second jacket pipelines, respectively; and
   wherein at least one of the inner transition element and the first and second cryogenic pipelines are at least partially enclosed by an insulating material.

2. The pipeline of claim 1 wherein the inner transition element has a pipe configuration with an inner diameter that is substantially identical to an inner diameter of the first and second cryogenic pipelines.

3. The pipeline of claim 1 wherein at least one of the outer transition elements has an outer diameter that is substantially identical to an outer diameter of the first and second jacket pipelines.

4. The pipeline of claim 1 further comprising a sleeve disposed in a space between the first and second outer transition elements.

5. The pipeline of claim 1 further comprising an external insulation that covers the first and second outer transition elements.

6. The pipeline of claim 1 wherein the inner transition element and the outer transition elements are contiguous.

7. The pipeline of claim 1 further comprising a weight coating coupled to at least one of the first and second jacket pipelines.

* * * * *